(12) United States Patent
Keerthi

(10) Patent No.: US 9,275,404 B2
(45) Date of Patent: Mar. 1, 2016

(54) ANALYZING COMMUNICATINS TO DETERMINE BUSINESS ENTITY POPULARITY

(75) Inventor: Arvind Vijay Keerthi, Karnataka (IN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 337 days.

(21) Appl. No.: 13/497,494

(22) PCT Filed: Jun. 16, 2011

(86) PCT No.: PCT/IB2011/052621
§ 371 (c)(1),
(2), (4) Date: Sep. 19, 2012

(87) PCT Pub. No.: WO2012/137043
PCT Pub. Date: Oct. 11, 2012

(65) Prior Publication Data
US 2013/0046706 A1    Feb. 21, 2013

(30) Foreign Application Priority Data
Apr. 7, 2011 (IN) .......................... 1227/CHE/2011

(51) Int. Cl.
G06Q 30/02 (2012.01)
G06Q 10/06 (2012.01)
G06Q 30/06 (2012.01)

(52) U.S. Cl.
CPC ................................ *G06Q 30/0282* (2013.01)

(58) Field of Classification Search
USPC .......................................... 705/347, 1.1–912
See application file for complete search history.

(56) References Cited

U.S. PATENT DOCUMENTS

| 2008/0015928 | A1  | 1/2008  | Chandra |
| 2009/0125320 | A1* | 5/2009  | Bickett ............................ 705/1 |
| 2009/0265332 | A1* | 10/2009 | Mushtaq et al. ................. 707/5 |
| 2010/0119053 | A1* | 5/2010  | Goeldi ..................... 379/265.09 |
| 2011/0078157 | A1* | 3/2011  | Sun et al. ..................... 707/749 |
| 2011/0276513 | A1* | 11/2011 | Erhart et al. ................. 705/347 |
| 2012/0246093 | A1* | 9/2012  | Stibel et al. .................. 705/347 |

FOREIGN PATENT DOCUMENTS

WO    WO 2010/043986    4/2010

OTHER PUBLICATIONS

International Search Report and Written Opinion from International Application No. PCT/IB2011/052621 dated Sep. 27, 2011.
Huntsvillepr.com; "Small Business SEO: How to Get First Page Google Ranking for Small Business Website"; www.huntsvillepr.com; retrieved Oct. 31, 2010.
Them.pro.com; "How to Improve the Popularity of your Business on TripAdvisor?"; www.them.pro.com; retrieved Oct. 31, 2010.

* cited by examiner

*Primary Examiner* — Jonathan Ouellette
(74) *Attorney, Agent, or Firm* — Workman Nydegger

(57) ABSTRACT

Techniques for determining the popularity of a business entity are provided. A communication is received at a computing system. The computing system searches the received communication for a business entity name. The computing system also searches the received communication for information related to an opinion about the business entity. Based on the information related to the opinion, the computing system determines a customer satisfaction rating of the business entity.

20 Claims, 6 Drawing Sheets

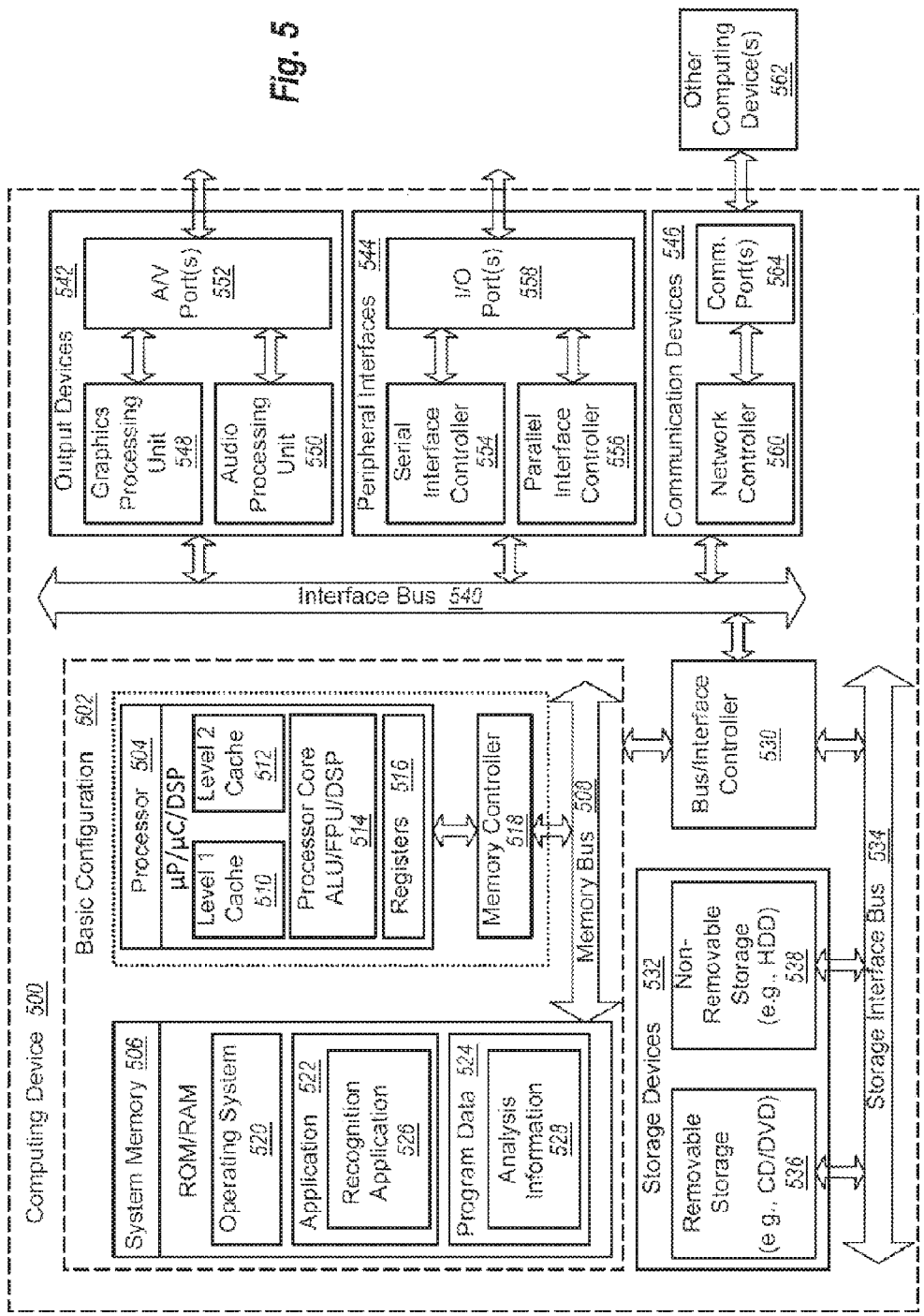

ANALYZING COMMUNICATIONS TO DETERMINE BUSINESS ENTITY POPULARITY

CROSS-REFERENCE TO RELATED APPLICATIONS

This application is a U.S. Nationalization under 35 U.S.C. §371 of PCT International Application No. PCT/IB2011/052621 filed 16 Jun. 2011, entitled "ANALYZING COMMUNICATIONS TO DETERMINE BUSINESS ENTITY POPULARITY," which claims priority to Indian Patent Application No. 1227/CHE/2011 filed 7 Apr. 2011, the contents of both of the foregoing applications are incorporated herein, in their entirety, by this reference.

BACKGROUND

Accessing on-line reviews of a business entity has become increasing popular for potential customers of the business entity. The on-line reviews allow the potential customers to learn information about the business entity such as the level of service and the quality of products offered by the business entity. This information may in turn help the potential customers determine if they desire to purchase the services and the products of the business entity.

On-line reviews, however, have some drawbacks that limit their effectiveness to the potential customers. For example, an on-line review of a particular business entity may be non-existent or may be incomplete. Further, in some cases existing on-line reviews may have been written by the owners or employees of the business entity and may thus include information that does not truly reflect the level of service and the quality of products offered by the business entity and does not reflect the opinion of actual customers of the business entity.

SUMMARY

An illustrative embodiment disclosed herein relates to a method and computer program product for a computing system to determine the popularity of a business entity. A communication is received at the computing system. The computing system searches the received communication for a business entity name. The computing system also searches the received communication for information related to an opinion about the business entity. Based on the information related to the opinion, the computing system determines a customer satisfaction rating of the business entity.

An illustrative embodiment disclosed herein relates to a system for analyzing communications to determine the popularity of a business entity. The system includes a first database that stores various business entity names. The system also includes a second database that stores words or phrases that indicate an opinion about the business entity. The system further includes a computing system that performs the following: receives a communication, accesses the first database to determine if the communication includes a business entity name that is included in the various business entity names, accesses the second data base to determine if any words or phrases in the communication that are associated with the business entity name match a word or phrase stored in the second database, and determines a customer satisfaction rating of the business entity based on the words or phrases of the communication that match the words or phrases of the second database.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 5 shows an example computing device that is for determining the popularity of a business entity in accordance with the present disclosure.

DETAILED DESCRIPTION

Figure 1:
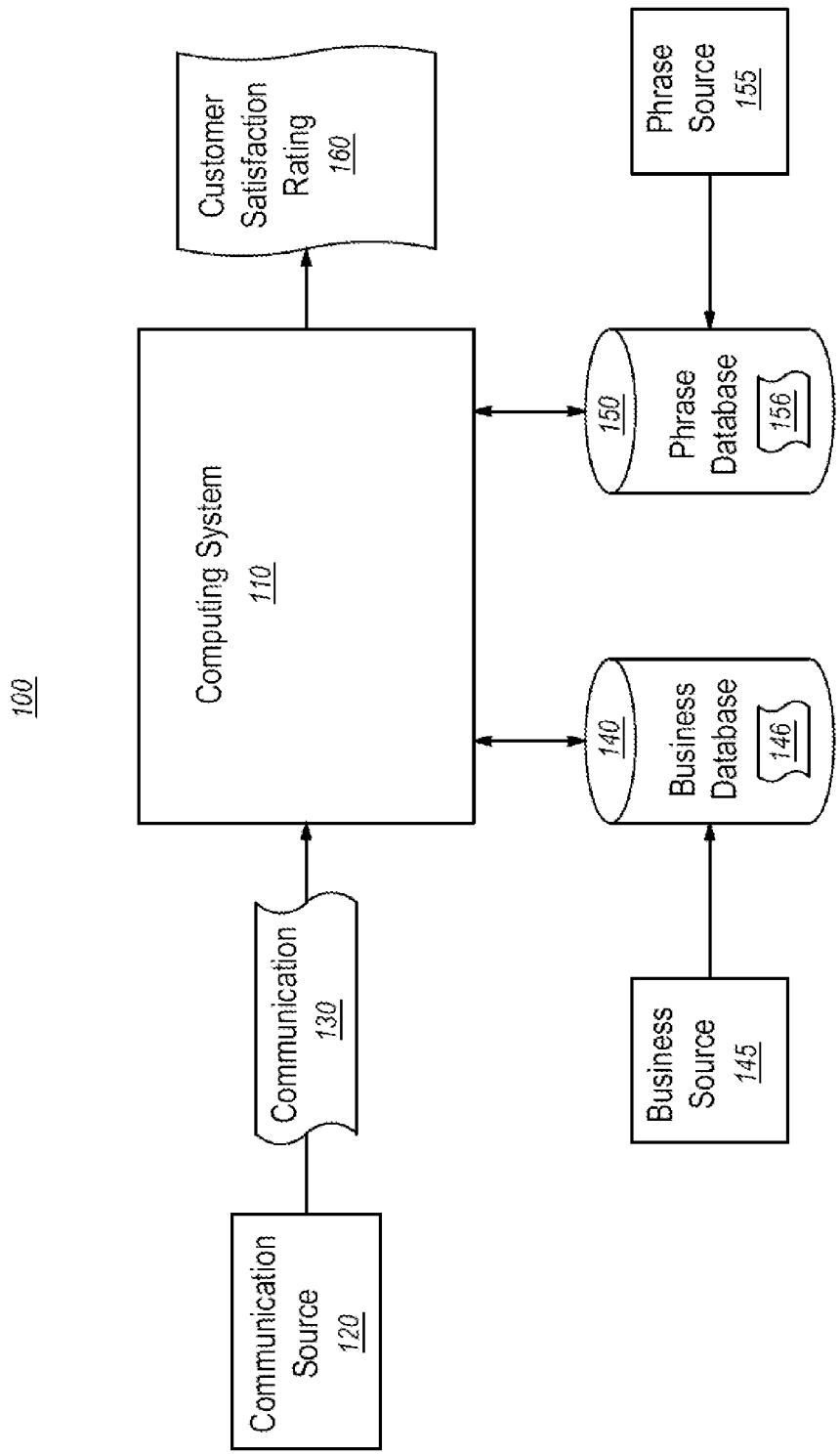
FIG. 1 is a schematic of an illustrative embodiment of a system for analyzing communications to determine the popularity of a business entity.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Embodiments disclosed herein relate to a system, method, and computer program product for determining the popularity of a business entity. A business entity may be any person, group, or organization that provides a product or service, either for profit or not for profit, to the public. Examples of a business entity include, but are not limited to, a restaurant, a store, a spa, an e-commerce provider, a peer to peer trading site, a sports team, a stadium, a music provider, a travel provider, and a public lodging facility such as a hotel. It will be understood that there are numerous types of business entities whose popularity may be determined by the embodiments disclosed herein.

According to an embodiment, a computing system receives a communication from a communication source. Examples of the communication include, but are not limited to, an email, a status message including a social network update, a chat room entry, a blog post, a video or other visual communication, or a voicemail. The communication may also be a telephone call. The telephone call may be a traditional land line telephone call, a cellular or other wireless network telephone call, or an internet telephone call. Accordingly, the communication source may be any device that is able to generate the communication, such as, but not limited to, a desktop computer, a portable computer, a smart phone, a cellular or other wireless phone, a land line phone, or a PDA.

According to an embodiment, the computing system may be part of a public network and is thus able to receive all or at least a significant portion of the communications on the public network. For example, the computing network may be part of a public email network and be able to receive all emails sent on the system. Alternatively, the computing system may be part of a land line telephone system or a cellular telephone system and be able to receive all calls sent on these telephone systems. Likewise, the computing system may be part of a social network and be able to receive all updates and other social network communications. The computing system may also be part of a private network of private groups and organizations and be able to receive all or at least a significant portion of the communications of these networks. It will be understood that the computing system may also be part of multiple public and private networks and may be able to receive communications of various formats and types as needed.

According to an embodiment, the computing system searches the received communication for the name of a business entity. In one embodiment, the computing system accesses a database that includes the names of business entities in a particular geographic area such as a city, state, country or even the entire world. The computing system then determines if the received communication contains a name that matches one of the business entity names found in the database of business entity names. In some embodiments, the received communication is also searched for business location and other attributes about the business such as, but not limited to, names of employees of the business entity, time of service, and product or service offered by the business entity.

According to an embodiment, the computing system also searches the received communication for information related to an opinion about the business entity. The opinion may be a positive opinion that indicates the sender of the communication was satisfied with business entity, a neutral opinion that indicates that the sender was neither satisfied nor unsatisfied with the business entity, or a negative opinion that indicates that the sender was unsatisfied with the business entity.

In one embodiment, the computing system accesses one or more phrases databases that include words and/or phrases that are indicative of a positive opinion, a neutral opinion, or a low opinion. The computing system searches portions of the received communication near to the business entity name for works and/or phrases that are also found in the phrase databases. If a match is found, then the computing system is able to determine a likely opinion of the business entity. For example, if the word "excellent" is found near to the business entity name, then it is likely the sender of the communication has a positive opinion of the business entity.

According to one embodiment, the computing system uses the information related to the opinion of the business entity to determine a customer satisfaction rating. The customer satisfaction rating may include a rating point system or reviews of the business entity. In one embodiment, whenever the computing system determines a positive opinion of the business entity the customer satisfaction rating is increased, whenever the computing system determines a neutral opinion of the business entity the customer satisfaction rating remains the same, and whenever the computing system determines a negative opinion of the business entity the customer satisfaction rating is decreased. The customer satisfaction rating may be stored in a publicly accessible database so that potential customers of the business entity may see the opinions of other customers of the business entity.

Several embodiments of respective aspects of the present disclosure are given below by way of example with reference to the accompanying figures. FIG. 1 is a schematic illustration of an embodiment of a system 100 for analyzing communications to determine the popularity of a business entity. The system 100 includes various elements that are used to analyze the communications and to determine the popularity of the business. As shown, the system 100 includes a computing system 110 that is communicatively connected to a communication source 120. Although not illustrated, the computing system 110 and the communication source 120 may communicate with each other bi-directionally over a network. The network may be any network that is compatible with the computing system 110 and the communication source 120 and may include, by way of example, satellite networks, 802.11 networks, personal computer networks (e.g., LAN, WAN), wireless networks (e.g., Bluetooth, WiFi), cellular networks, wireless networks, telephony networks (e.g., landline or PSTN), data networks, the Internet, other known communications networks or the like or any combination thereof.

The communication source 120 may generate a communication 130. Examples of the communication 130 include, but are not limited to, an email, a status message including a social network update, a chat room entry, a blog post, a video or other visual communication, or a voicemail. The communication 130 may also be a telephone call. The telephone call may be a traditional land line telephone call, a cellular or other wireless network telephone call, or an internet telephone call. Accordingly, the communication source 120 may be any device that is able to generate the communication 130, such as, but not limited to, a desktop computer, a portable computer, a smart phone, a cellular or other wireless phone, a land line phone, a PDA, or the like or any combination thereof.

The system 100 also includes a business database 140. The business database 140 may be any type of reasonable non-volatile or volatile memory. Although shown as being separate from the computing system 110, in some embodiments the business database 140 is included in the computing system 110. The business database 140 may store a list of business entity names and locations 146. The list of business entity names and locations 146 may include all the business names and their associated locations in a particular geographic area such as a city, state, or country. In some embodiments, the list of business entity names and locations 146 may include the names and locations of all business entities in the entire world. It will be understood that the actual number of business entity names and locations included in the list of business entity names and locations 146 may vary as circumstances warrant. It will also be understood that not all listed business entity names need have an associated location also listed.

In one embodiment, the list of business entity names and locations 146 may be generated from a business source 145. The business source 145 may be a listing of business names and locations such as a phone book, government records, trade association records or the like. The business source 145 may also be a map program or other software such as Google Map Maker that combines a list of business names with GPS data. It will be understood that the business source 145 may be any source that is able to provide the names of business entities and their associated locations for a desired geographic location. It will also be understood that the list of business entity names and locations 146 may be generated from multiple business sources 145.

The system 100 further includes a phrase database 150. The phrase database 150 may be any type of reasonable non-volatile or volatile memory. Although shown as being separate from the computing system 110, in some embodiments the phrase database 150 is included in the computing system 110. In addition, in some embodiments the phrase database 150 may be part of the business database 140. As will be described in more detail to follow, the phrase database 150 may include multiple individual databases.

The phrase database 150 may store a list of words and/or phrases 156 that are indicative of an opinion about a business entity and that correspond to information related to an opinion about a business entity. As will be described in more detail to follow, the list of words and/or phrases 156 may include high satisfaction words and/or phrases that indicate a positive opinion of the business entity, mid-satisfaction words and/or phrases that indicate a neutral opinion of the business entity, and low satisfaction words and/or phrases that indicate a low opinion of the business entity, or any combination thereof.

In one embodiment, the list of words and/or phrases 156 may be generated from a phrase source 155. The phrase source 155 may be a dictionary, a thesaurus, an encyclopedia, or any other source of words or phrases in one or more languages that can be used to generate the list of words and/or phrases 156. Since languages are constantly changing, the list of words and/or phrases 156 may be updated as needed with new words and/or phrases that are indicative of the opinion about the business entity.

The communication 130 may be received by the computing system 110. As will be described in more detail to follow, the computing system 110, which may be any reasonable computing system, may search the communication for a business entity name. For example, in one embodiment, the computing system 110 may access the business database 140 and may then search the communication 130 for an occurrence of a business entity name found in the list of business entity names and locations 146.

The computing system 110 may also search the received communication 130 for information relating to the opinion about the business entity. For example, in one embodiment, the computing system 110 may access the phrase database 150 and then search one or more parts of the received communication 130 for an occurrence of one or more words and/or phrases found in the list of words and/or phrases 156 that are near to the occurrence of the business entity name.

The computing system 110 may then use the information relating to the opinion about the business entity to generate a customer satisfaction rating 160. For example, in one embodiment, the customer satisfaction rating 160 may be based on a point system where a favorable rating point is awarded when the occurrence of a word and/or phrase found in the list of words and/or phrases 156 indicates a positive opinion. Alternatively, a neutral or an unfavorable rating point may be awarded when the occurrence of a word and/or phrase found in the list of words and/or phrases 156 indicates a neutral or a low opinion of the business entity. In other embodiments, the customer satisfaction rating 160 may include customer reviews of the business entity that are based on the communication 130. It will be understood that the customer satisfaction rating 160 may be of any form that indicates to any reader of the customer satisfaction rating 160 customer opinions of the business entity. As will be described in more detail to follow, the customer satisfaction rating 160 may be publically accessible. Accordingly, regardless of its form, the customer satisfaction rating 160 allows for a multi-sourced rating that may be updated automatically and be made available to all customers of the business entity.

Figure 2:
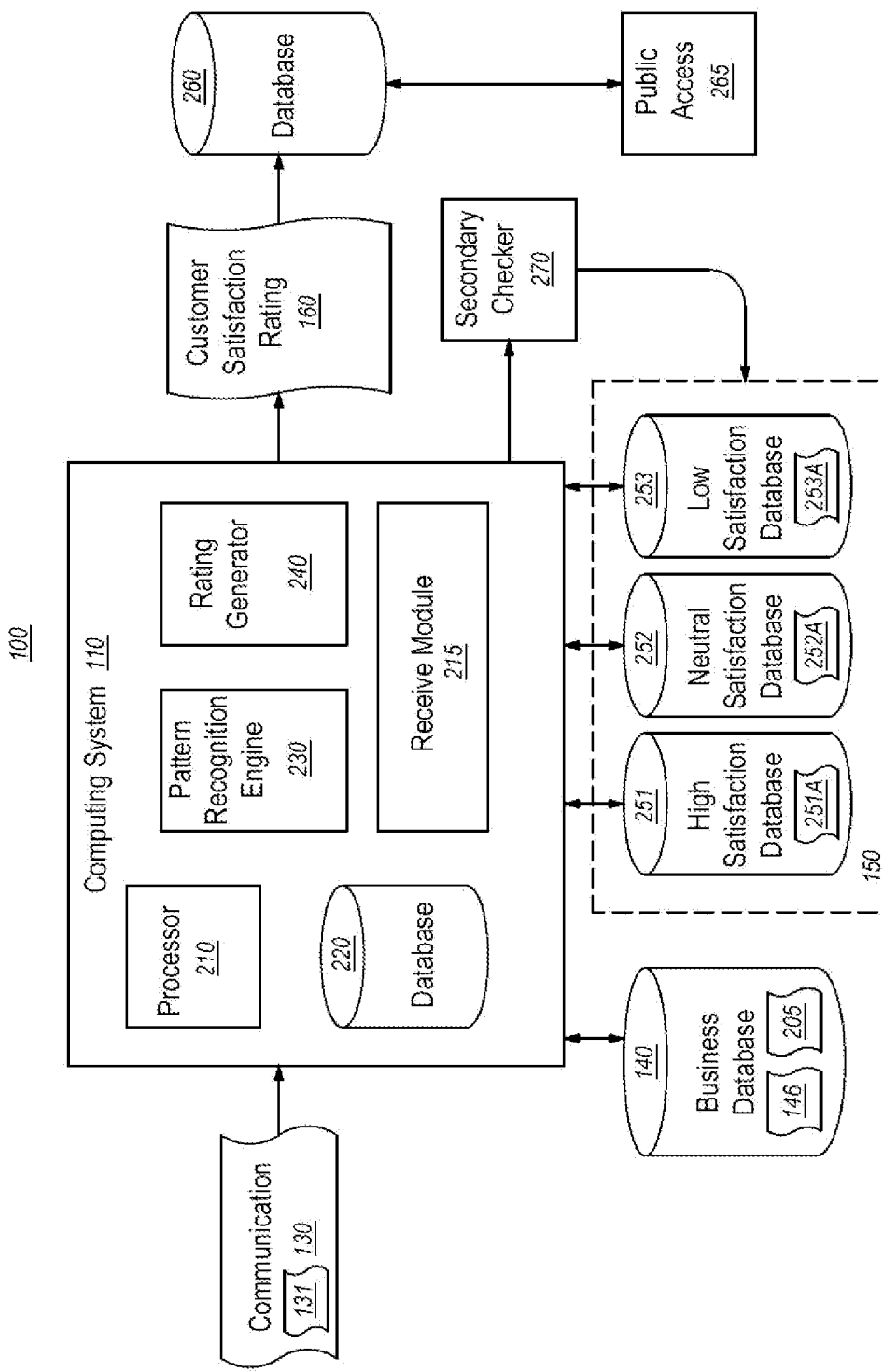
FIG. 2 is an alternative schematic of the embodiment of the system for analyzing communications to determine the popularity of a business entity of FIG. 1.

FIG. 2 illustrates an illustrative embodiment of the computing system 110 as well as a more detailed view of an embodiment of the system 100. In FIG. 2, the network the communication source 120, the business source 145, and the phrase source 155 have been omitted so that the additional features of this figure may be seen more clearly. As shown, the computing system 110 includes various operational modules and databases that will be explained in more detail. Although not shown as being coupled, so as to not distract from the embodiments disclosed herein, it will be understood that the various operational modules and databases of the computing system 110 may be coupled to each other by any reasonable means such as a computer bus, other wiring, or wireless connection as circumstances warrant. It will also be understood that the computing system 110 may include more or less than the operational modules and databases shown and that one or more of the operational modules and databases may be combined with or be part of another operational module or database.

As shown, the computing system 110 includes a processor 210. The processor 210 may be any reasonable processor and in operation allows the computing system 110 to perform various operations. In some embodiments, the processor 210 may be accessed by the various operational modules of the computing system 110 to provide the modules processing resources. In other embodiments, the operational modules may have access to an alternative processor.

The computing system 110 also includes a database 220. The database 220 may be any type of reasonable non-volatile or volatile memory. The database 220 is used to store information needed by the computing system 110 to perform its operations. In some embodiments, the database 220 may correspond to the other databases disclosed herein.

A receive module 215 may receive the communication 130 from the communication source 120. In one embodiment, the receive module 215 may remove personal identifiable information from the communication 130. For example, if the communication 130 is an email, the receive module 215 may remove any header information that may identify the sender or the receiver. Likewise, if the communication 130 is a phone call, the receive module 215 may remove any routing information that may identify the sending or receiving parties. The receive module 215 may remove personal identifiable information from other forms of communication 130. In this way, privacy of the sending and receiving parties is preserved.

In one embodiment, the receive module 215 converts the received communication 130 into a transcript that is readable by other modules of the computing system 110. For example, if the communication 130 includes an audible communication such as a telephone call or a video, the receive module 215 may convert the audible communication into a transcript that is more easily readable by a pattern recognition engine 230. In other embodiments, the receive module 215 may have no need to convert the received communication 130 into a transcript that is readable by other modules of the computing system 110 when the other module are able to process the audible communication.

The computing system 110 includes a pattern recognition engine 230. The pattern recognition engine 230 may receive or otherwise access the communication 130 from the receive module 215. In one embodiment, the pattern recognition engine 230 receives the communication 130 after it has been converted into a transcript that is more easily readable by the pattern recognition engine 230 as previously described. In other embodiments, the pattern recognition engine 230 includes a speech recognition engine that allows the pattern recognition engine 230 to directly process audible communication 130. In still other embodiments, the pattern recognition engine 230 may be a speech recognition engine.

After receiving the communication 130 from the receive module 215, the pattern recognition engine 230 may access the business database 140 that includes the list of business entity names and locations 146. The pattern recognition engine 230 may search the communication 130 for a business entity name that is also included on the list of business entity names and locations 146. In some embodiments, the pattern recognition engine 230 may search the communication 130 for the location of the business entity that is also included on the list of business entity names and locations 146.

In some embodiments the phrase database 150 may include one or more individual databases 251, 252, and 253 as illustrated by the dashed lines in FIG. 2. It will be understood that the phrase database may include more or less than three individual databases and that as previously discussed, the phrase database 150 may be a single database.

For example, the database 251 may be a high satisfaction database that includes high satisfaction words and/or phrases 251A that are indicative of a positive opinion about the business entity. Examples of the high satisfaction words and/or phrases 251A include, but are not limited to, "competent", "excellent service", "recommended" and any other word or phrase that indicates that the sender of communication 130 was satisfied with the business entity. It will be understood that the high satisfaction words and/or phrases 251A are an example of information relating to an opinion about the business entity and may correspond to the list of words and/or phrases 156.

The database 252 may be a neutral satisfaction database that includes neutral satisfaction words and/or phrases 252A that are indicative of a neutral opinion about the business entity. Examples of neutral satisfaction words and/or phrases 252A include, but are not limited to, "OK", "value for the money", and any other word or phrase that indicates that the sender of communication was neither satisfied nor unsatisfied with the business entity. It will be understood that the neutral satisfaction words and/or phrases 252A are an example of information relating to an opinion about the business entity and may correspond to the list of words and/or phrases 156.

The database 253 may be a low satisfaction database that includes low satisfaction words and/or phrases 253A that are indicative of a negative opinion about the business entity. Examples of low satisfaction words and/or phrases 253A include, but are not limited to, "avoid", "terrible service", "too expensive" and any other word or phrase that indicates that the sender of communication was unsatisfied with the business entity. It will be understood that the low satisfaction words and/or phrases 253A are an example of information relating to an opinion about the business entity and may correspond to the list of words and/or phrases 156.

In those embodiments where the phrase database 150 includes the individual databases 251, 252, and 253, the pattern recognition engine 230 may access each of the individual databases. The pattern recognition engine 230 may then search the communication 130 for words and/or phrases found in the high satisfaction words and/or phrases 251A that are near to the occurrence of the business entity name, may search the communication 130 for words and/or phrases found in the neutral satisfaction words and/or phrases 252A that are near to the occurrence of the business entity name, and may search the communication 130 for words and/or phrases found in the low satisfaction words and/or phrases 253A that are near to the occurrence of the business entity name.

In one embodiment, the communication 130 may be a telephone call that includes a first call leg including the voice communication of the caller and a second call leg including the voice communication of the call recipient. Thus, both the first call leg and the second call leg constitute a two-way telephone call. In such embodiments, the pattern recognition engine may search both the first and second call legs for the business entity name. The pattern recognition engine may also search the first call leg for information, such as the high satisfaction words and/or phrases 251A, neutral satisfaction words and/or phrases 252A, and the low satisfaction words and/or phrases 253A, which relate to and indicate the caller's opinion of the business entity. Likewise, the pattern recognition engine may also search the second call leg for information, such as the high satisfaction words and/or phrases 251A, neutral satisfaction words and/or phrases 252A, and the low satisfaction words and/or phrases 253A, which relate to and indicate the call recipient's opinion of the business entity. In this way, information that may be used to generate the customer satisfaction rating 160 may be discovered in both call legs.

The computing system 110 includes a rating generator 240. The rating generator 240 may receive the high satisfaction words and/or phrases 251A, the neutral satisfaction words and/or phrases 252A, and/or the low satisfaction words and/or phrases 253A (i.e., the information relating to the opinion about the business entity) and may then generate the customer satisfaction rating 160. As previously described, the customer satisfaction rating 160 may be a rating point system or a database of customer reviews.

In one embodiment, when the pattern recognition engine 230 finds one or more high satisfaction words and/or phrases 251A indicating a positive opinion of the business entity in the communication 130, the rating generator 240 may cause the customer satisfaction rating 160 to increase. Likewise, when the pattern recognition engine 230 finds one or more neutral satisfaction words and/or phrases 252A indicating a neutral opinion of the business entity in the communication 130, the rating generator 240 may cause the customer satisfaction rating 160 to stay the same. Similarly, when the pattern recognition engine 230 finds one or more low satisfaction words and/or phrases 253A indicating a negative opinion of the business entity in the communication 130, the rating generator 240 may cause the customer satisfaction rating 160 to decrease. Accordingly, the customer satisfaction rating 160 is automatically updated to reflect changes in customer opinion about the business entity.

In one embodiment, the rating generator 240 may store the customer satisfaction rating 160 in a database 260. The database 260 may be any type of reasonable non-volatile or volatile memory. Although shown as being separate from the computing system 110, in some embodiments the database 260 is included in the computing system 110 and may correspond to the database 220. In some embodiments, the customer satisfaction rating 160 stored in the database 260 may be made publicly accessible through a public access 265. The public access 265, which may be any device that may access the database 260, may allow a member of the public to view the customer satisfaction rating 160 so that he or she may learn what opinions other customers of the business entity have.

Figure 3A:
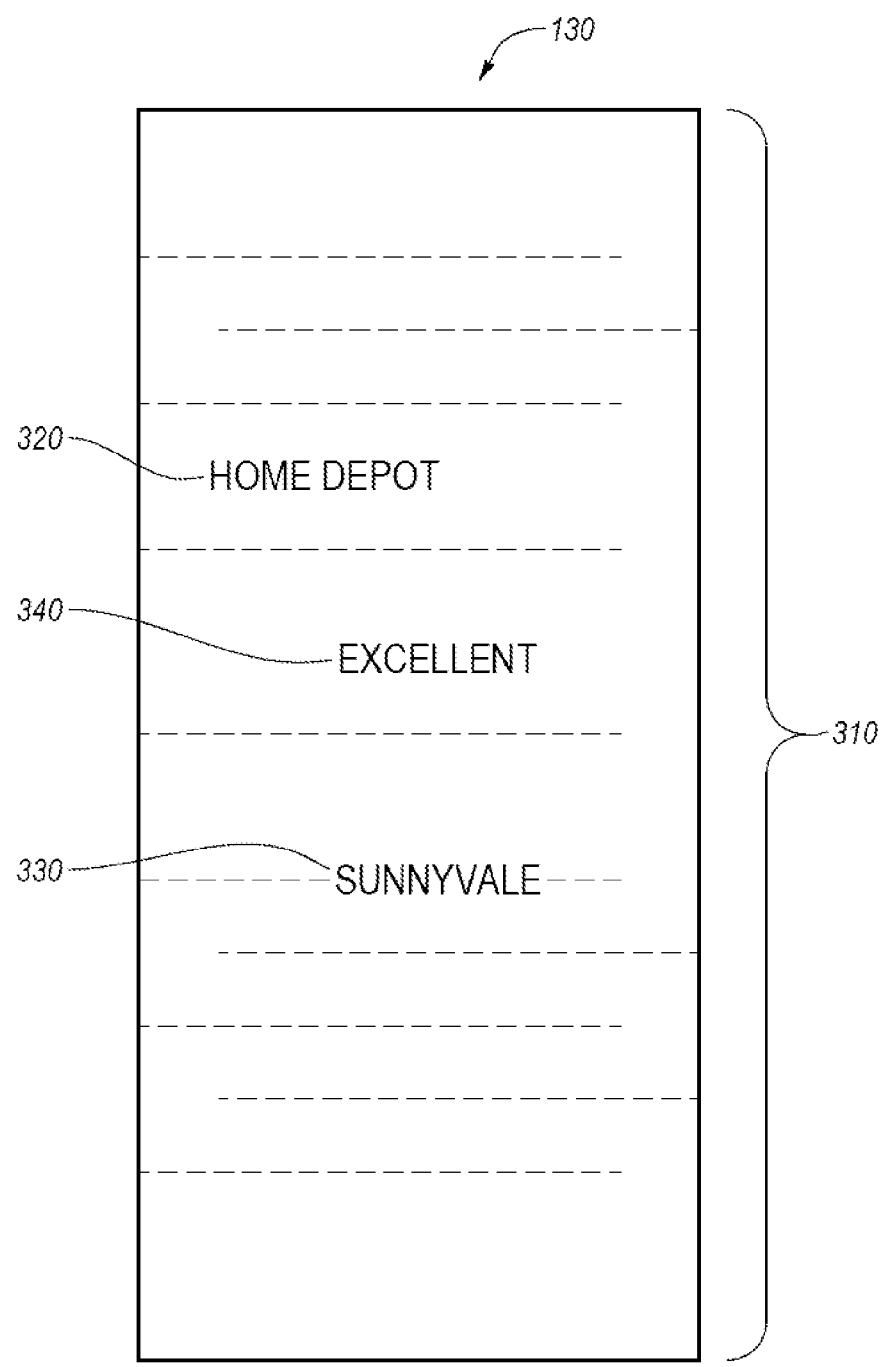
FIG. 3A is an example embodiment of a communication.

Attention is now given to FIG. 3A, which shows an example embodiment of a communication 130. The example embodiment of FIG. 3A may be a written communication 130 such as an email, a blog post, a chat room entry, or a status update, or it may be an audible communication that has been converted to a transcript by the receive module 215 as previously described. As shown in FIG. 3A, the communication 130 includes various communication text 310 indicated by the dashed lines that constitute the body of the communication. Included in the text 310 are a business entity name 320 and a location of the business entity 330. In addition, the text 310 includes a word or phrase 340, in this case the word "excellent", which is indicative of an opinion the sender of the communication 130 has of the business entity name 320.

A specific example will now be discussed using the embodiment of FIG. 3A. During operation, the pattern recognition engine 230 would search the example embodiment of the communication 130 shown in FIG. 3A while also accessing the business database 140, the high satisfaction database 251, the neutral satisfaction database 252, and the low satisfaction database 253. While searching, the pattern recognition engine 230 would discover the business entity name 320 and the location 330 in the communication text 310 based on matching this business entity name and location with the same name and location that is stored in the accessed business database 140. Since the communication 130 included a business entity name, the pattern recognition engine 230 would search those parts of the communication text 310 that were near to the occurrences of the business entity name 320 and the location 330. In the illustrated embodiment, the pattern recognition engine 230 would discover the word "excellent" 340 near the business entity name 320 based on matching this word with the same word that is stored in the accessed high satisfaction database 251. The rating generator 240 would then increase the customer satisfaction rating 160 since the word "excellent" would indicate a positive opinion of the business entity.

In some embodiments the pattern recognition engine 230 may determine while searching the communication 130 for information related to the opinion that the communication 130 does not include such information. In many instances this will occur because the communication 130 does not in fact include a business entity name, location, or information related to an opinion of the business entity as the communication is related to another subject matter.

However, in some embodiments, a communication 130 may include a business entity name but not enough information for the pattern recognition engine 230 to determine what opinion the sender has about the business entity. In other word, while searching the received communication for information relating to the opinion about the business entity, the pattern recognition engine 230 may determine that the information is insufficient to determine the opinion.

In some embodiments, the system 100 may include a secondary checker 270. In some embodiments, the secondary checker 270 may be a computing system that is part of the computing system 110 or that is separate from the computing system 110. In other embodiments, the secondary checker 270 may be human. The computing system 110 may forward the communication 130 to the secondary checker 270 in response to the pattern recognition engine 230 not being able to determine an opinion. The secondary checker 270 may then analyze the communication 130 for information that may be used to determine the customer satisfaction rating 160. For example, the secondary checker 270 may be able to determine based on the context of the communication 130 that certain words or phrases are indicative of an opinion of the business entity. Alternatively, the secondary checker 270 may find words or phrases are indicative of an opinion of the business entity, but that have not yet been added to the phrase database 150 or the high satisfaction database 251, the neutral satisfaction database 252, and the low satisfaction database 253. In such cases, the secondary checker 270 may provide the newly found words or phrases to one of the phrase databases or the secondary checker 270 may teach the pattern recognition engine 230 the newly found words or phrases. Thus, the computing system 110 may receive information from the secondary checker that updates the computing system 110 with the analysis performed by the secondary checker.

Figure 3B:
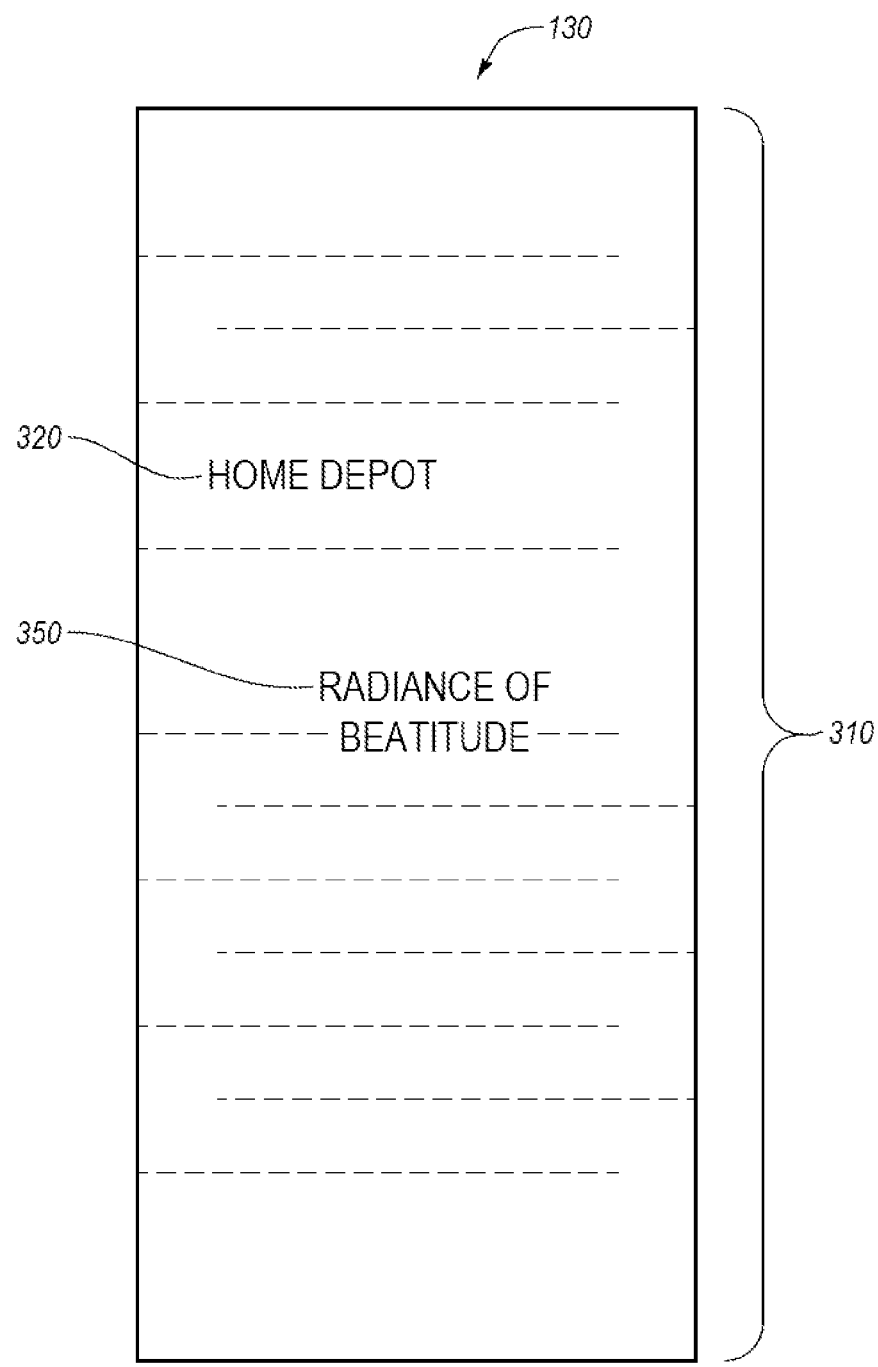
FIG. 3B is an example embodiment of a communication.

Attention is now made to FIG. 3B, which shows an example embodiment of a communication 130. The example embodiment of FIG. 3B may be a written communication 130 such as an email, a blog post, a chat room entry, or a status update, or it may be an audible communication that has been converted to a transcript by the receive module 215 as previously described. As shown in FIG. 3B, the communication 130 includes various communication text 310 indicated by the dashed lines that constitute the body of the communication. Included in the text 310 is a business entity name 320. In addition, the text 310 includes the phrase "radiance of beatitude" 350.

A specific example will now be discussed using the embodiment of FIG. 3B. During operation, the pattern recognition engine 230 would search the example embodiment of the communication 130 shown in FIG. 3B while also accessing the business database 140, the high satisfaction database 251, the neutral satisfaction database 252, and the low satisfaction database 253. While searching, the pattern recognition engine 230 would discover the business entity name 320 based on the same name being stored in the accessed business database 140. Since the communication 130 included a business entity name, the pattern recognition engine 230 would search those parts of the communication text 310 that were near to the occurrences of the business entity name 320. In the illustrated embodiment, the pattern recognition engine 230 would discover the phrase "radiance of beatitude" 350 near the business entity name 320. However, since this phrase would not be found in the high satisfaction database 251, the neutral satisfaction database 252, or the low satisfaction database 253, the pattern recognition engine 230 would be unable to determine the opinion of the business entity.

The computing system 110 would then provide the communication to the secondary checker 270. As described above, the secondary checker 270 would analyze the communication 130 to determine if the phrase "radiance of beatitude" 350 was indicative of an opinion of the business entity. If the secondary checker determined that the phrase "radiance of beatitude" 350 was indicative of an opinion, then the secondary checker would provide this information to the computing system 110 as discussed.

In some embodiments, the communication 130 may include attributes 131 related to the business entity. For example, the attributes 131 may include, but are not limited to, one or more of names of employees of the business entity, time of service, and product or service offered by the business entity.

In some embodiments, the business database 140 may include attributes 205. The attributes 205 may be generated from the business source 145 or from some other source. For example, the business source 145 or some other source may indicate that Sally is a server at a business entity, that a business entity serves Mexican food, or that a business entity operates during certain hours. These and other attributes would be stored in the business database 140 as part of the attributes 205.

In such embodiments, the pattern recognition engine 230 may search the communication 130 for the attributes 131 after determining the business entity name. For instance, a communication 130 may indicate that Sally, an attribute 131, was an excellent server. The pattern recognition engine 230 may access the attributes 205 to verify that Sally was a server at the business entity. The pattern recognition engine 230 also accesses the high satisfaction database 251, the neutral satisfaction database 252, and the low satisfaction database 253 to find words and phrases that indicate an opinion of Sally the server. In this case, since the word "excellent" was found near Sally, a positive opinion may be inferred.

In another embodiment, the communication 130 may indicate that the business entity serves tasteless Mexican food, an attribute 131. The pattern recognition engine 230 may access the attributes 205 to verify that the business entity serves Mexican food. The pattern recognition engine 230 also accesses the high satisfaction database 251, the neutral satisfaction database 252, and the low satisfaction database 253 to find words and phrases that indicate an opinion of the Mexican food. In this case, since the word "tasteless" was found near Mexican food, a negative opinion may be inferred.

The rating generator 240 may then use the opinion based on the attributes 131 to determine the customer satisfaction rating 160. In some embodiments, the customer satisfaction rating may be based entirely on the attribute 131 and not the business entity as a whole. For example, in the example embodiment using Sally the server, the fact that Sally was an excellent server may be what is indicated in the customer satisfaction rating 160 without other information about the business entity being included in the customer satisfaction rating 160.

In some embodiments, the pattern recognition engine 230 may detect indirect references to the business entity in the communication 130 after the pattern recognition engine 230 has found a business entity name in the communication 130 in the manner previously described. For example, suppose the communication 130 may include a sentence that says "this has got to be the worst hotel I have ever stayed in" and that the pattern recognition engine 230 determined that the business entity name was the name of a hotel. In this case, the demonstrative adjective "this" refers back to the name of the hotel. Accordingly, the pattern recognition engine 230 may search the portions of the communication 130 near to "this" for information relating to the opinion of the business entity in the manner previously described. For instance, since the word "worst" is near to "this" a negative opinion is indicated.

Figure 4:
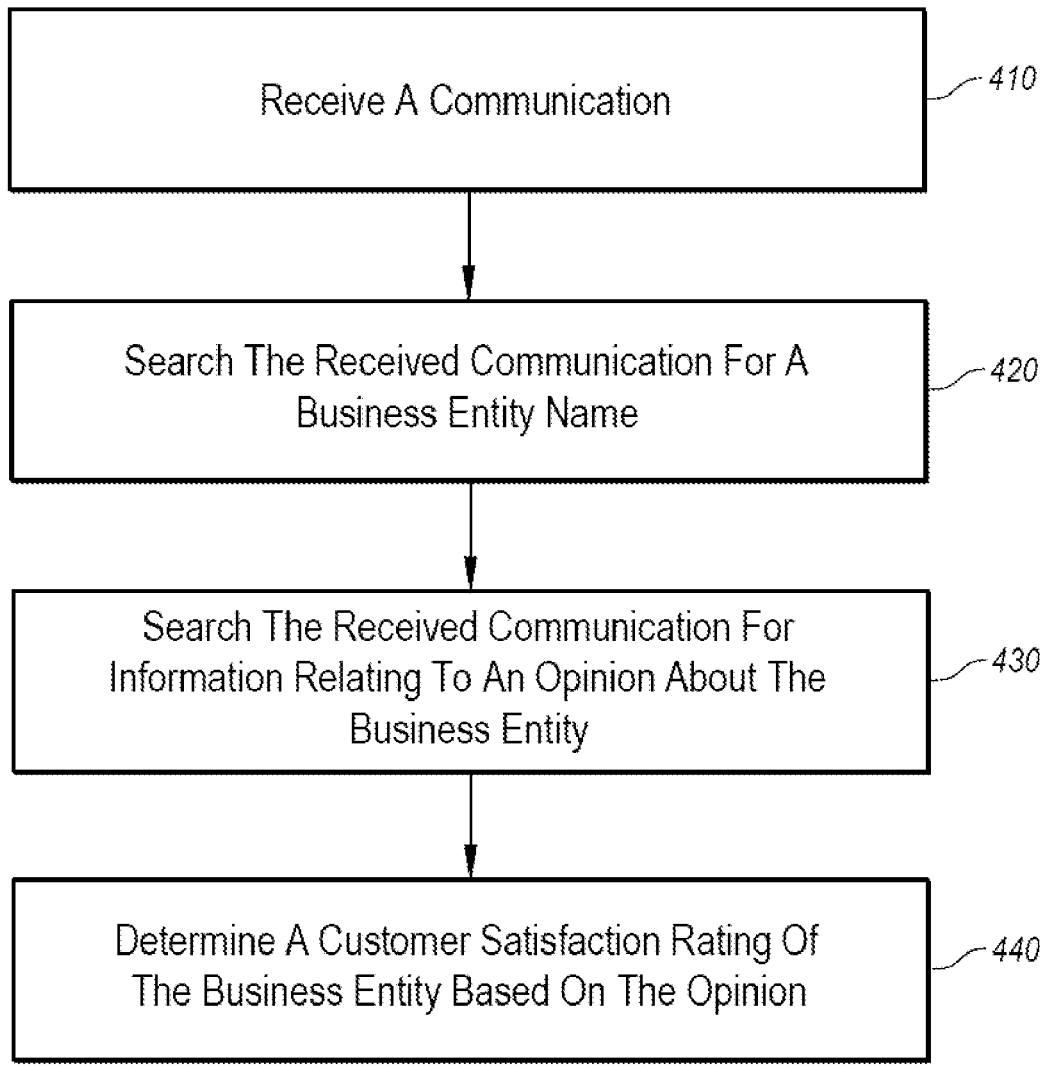
FIG. 4 is a flow diagram of an embodiment of a method for determining the popularity of a business entity.

FIG. 4 is a flow diagram of an illustrative embodiment of a method 400 for determining the popularity of a business entity. In the illustrated embodiment, the method 400, and other methods and processes described herein, set forth various functional blocks or actions that may be described as processing steps, functional operations, events and/or acts, etc., which may be performed by hardware, software, and/or firmware. The method 400 includes one or more operations as illustrated by blocks 410, 420, 430, and 440. In block 410, a communication is received. For example, in one illustrative embodiment, the computing system 110 may receive a communication 130. Examples of the communication 130 include, but are not limited to, an email, a status message including a social network update, a chat room entry, a blog post, a video or other visual communication, or a voicemail. The communication 130 may also be a telephone call or a voicemail. The telephone call may be a traditional land line telephone call, a cellular or other wireless network telephone call, or an internet telephone call.

In block 420, the received communication is searched for a business entity name. For example, the computing system 110, specifically the pattern recognition engine 230 in some embodiments, searches the communication 130 for a business entity name 320. In one embodiment, the computing system 110 access the business database 140 and then searches the communication 130 for an occurrence of a business entity name 320 found in the list of business entity names and locations 146 that is stored in the business database 140.

In block 430, the received communication is searched for information relating to an opinion about the business entity. For example, the computing system 110, specifically the pattern recognition engine 230 in some embodiments, searches the communication 130 for information that is indicative of the opinion about the business entity. In one embodiment, the information relating to an opinion about the business entity may be words or phrases that are indicative of an opinion about a business entity. In some embodiments, the computing system 110 accesses a phrase database 150, which may include the high satisfaction database 251, the neutral satisfaction database 252, and the low satisfaction database 253. The computing system 110 searches the communication 130 for the occurrence of one or more words or phrases from the list of words and/or phrases 156 that are indicative of an opinion about a business entity. The list of words and/or phrases 156 may include high satisfaction words and/or phrases that indicate a positive opinion of the business entity, mid-satisfaction words and/or phrases that indicate a neutral opinion of the business entity, and low satisfaction words and/or phrases that indicate a low opinion of the business entity.

In block 440, a customer satisfaction rating of the business entity is determined based on the information relating to the opinion of the business entity. For example, the computing system 110, specifically the rating generator 240 in some embodiments, generates the customer satisfaction rating 160 based on the high satisfaction words and/or phrases that indicate a positive opinion of the business entity, the mid-satisfaction words and/or phrases that indicate a neutral opinion of the business entity, or the low satisfaction words and/or phrases that indicate a low opinion of the business entity. As described, the rating generator 240 may automatically update the customer satisfaction rating 160 based on the opinion of the business entity.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

FIG. 5 shows an example computing device 500 that is arranged for verifying work performed by untrusted computing nodes in a distributed computing system in accordance with the present disclosure. In a very basic configuration 502, computing device 500 generally includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include a recognition application 526 that is arranged to perform the functions as described herein including those described with respect to method 400 of FIG. 4. Program Data 524 may include analysis information 528 that may be useful for analyzing the results provided by pattern recognition generator. In some embodiments, application 522 may be arranged to operate with program data 524 on operating system 520 such that the work performed by untrusted computing nodes can be verified as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be understood that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method for determining the popularity of a business entity, the method comprising:
   receiving, at a computing system, at least a substantial portion of all communications transmitted on a public or private network, the received at least substantial portion of all communications being between two or more entities not related to a business entity and including information that in a first instance is relevant to the business entity and in a second instance is not relevant to the business entity;
   in response to receiving the at least substantial portion of all communications received on the public or private network, searching the received communication for information related to an opinion about the business entity, searching for information related to an opinion about the business entity comprising:
      accessing a first database that includes a plurality of business entity names, the plurality of business entity names being related to a specific geographical location;
      searching at a processor the received communication to determine that the communication includes a business entity name included in the first database;
      accessing a second database that includes words or phrases that are indicative of the opinion of the business entity;
      searching at the processor one or more portions of the received communication that are in close proximity to an occurrence of the business entity name for one or more words or phrases that are included in the second database; and
      determining at the processor a customer satisfaction rating of the business entity based on the words or phrases of the communication that are in close proximity to the business entity name that match the words or phrases of the second database.

2. The method of claim 1, further comprising:
   storing the customer satisfaction rating in a database that is accessible by all customers of the business entity.

3. The method of claim 1, wherein the second database comprises a database of high satisfaction words or phrases that are indicative of a positive opinion about the business entity, a database of mid-satisfaction words or phrases that are indicative of a neutral opinion about the business entity and a database of low satisfaction words or phrases that are indicative of a negative opinion about the business entity.

4. The method of claim 1, wherein the received communication comprises attributes related to the business entity, the method further comprising:
   searching the received communication for the attributes; and
   using the attributes to help determine the customer satisfaction rating.

5. The method of claim 1, wherein the received communication is one of an email, a status message, a social network update, a blog post, a chat room entry, or a telephone call.

6. The method of claim 1, further comprising:
   determining, while searching for the one or more words or phrases that are included in the second database, that the communication includes insufficient information to determine the customer satisfaction rating based on a comparison with the one or more words or phrases;
   in response, forwarding the communication to a secondary checker for further analysis to determine if contents of the communication other than the one or more words or phrases may be used to determine the customer satisfaction rating.

7. The method of claim 6, further comprising:
   receiving information from the secondary checker that updates the computing system with the analysis performed by the secondary checker.

8. A computer program product, for use in a computing system including a processor and a memory, for implementing a method for determining the popularity of a business entity, the computer program product comprising one or more physical non-transitory computer readable media having stored thereon computer-executable instructions that, when executed by the processor, cause the computing system to:
   receive at least a substantial portion of all communications transmitted on a public or private network, the received at least substantial portion of all communications being between two or more entities not related to a business entity and including information that in a first instance is relevant to the business entity and in a second instance is not relevant to the business entity;
   in response to receiving the at least substantial portion of all communications received on the public or private network, searching the received communication for information related to an opinion about the business entity, searching for information related to an opinion about the business entity comprising:
      access a first database that includes a plurality of business entity names, the plurality of business entity names being related to a specific geographical location;
      search the received communication to determine that the communication includes a business entity name included in the first database;
      access a second database that includes words or phrases that are indicative of an opinion of the business entity;

search one or more portions of the received communication that are in close proximity to an occurrence of the business entity name for one or more words or phrases that are included in the second database; and determine a customer satisfaction rating of the business entity based on the words or phrases of the communication that are in close proximity to the business entity name that match the words or phrases of the second database.

9. The computer program product of claim 8, further comprising:

storing the customer satisfaction rating in a database that is accessible by all customers of the business entity.

10. The computer program product of claim 8, wherein the database comprises a database of high satisfaction words or phrases that are indicative of a positive opinion about the business entity, a database of mid-satisfaction words or phrases that are indicative of a neutral opinion about the business entity and a database of low satisfaction words or phrases that are indicative of a negative opinion about the business entity.

11. The computer program product of claim 8, wherein the received communication comprises attributes related to the business entity, the method further comprising:

searching the received communication for the attributes; and using the attributes to help determine the customer satisfaction rating.

12. The computer program product of claim 8, wherein the received communication is one of an email, a status message, a social network update, a blog post, a chat room entry, or a telephone call.

13. The computer program product of claim 8, further comprising:

determining, while searching for the one or more words or phrases that are included in the second database, that the communication includes insufficient information to determine the customer satisfaction rating based on a comparison with the one or more words or phrases;

in response, forwarding the communication to a secondary checker for further analysis to determine if contents of the communication other than the one or more words or phrases may be used to determine the customer satisfaction rating.

14. The computer program product of claim 13, further comprising:

receiving information from the secondary checker that updates the computing system with the analysis performed by the secondary checker.

15. A system for analyzing communications to determine the popularity of a business entity, the system comprising:

a first database adapted to store a plurality of business entity names;

a second database adapted to store words or phrases that are indicative of an opinion about the business entity; and a computing system including a processor and one or more non-transitory computer readable media, the computing system adapted to perform the following:

receive at least a substantial portion of all communications transmitted on a public or private network, the received at least substantial portion of all communications including a communications being between two or more entities not related to the business entity and including information that in a first instance is relevant to the business entity or and in a second instance is not relevant to the business entity;

in response to receiving the at least substantial portion of all communications received on the public or private network, searching the received communication for information related to the opinion about the business entity, searching for information related to an opinion about the business entity comprising:

access the first database to determine if the communication includes a business entity name that is included in the plurality of business entity names;

access the second data base to determine if any words or phrases in the communication that are in close proximity to the business entity name match a word or phrase stored in the second database; and determine a customer satisfaction rating of the business entity based on the words or phrases of the communication that match the words or phrases of the second database.

16. The system of claim 15, wherein the second database comprises a database of high satisfaction words or phrases that are indicative of a positive opinion about the business entity.

17. The system of claim 15, wherein the second database comprises a database of mid-satisfaction words or phrases that are indicative of a neutral opinion about the business entity.

18. The system of claim 15, wherein the second database comprises a database of low satisfaction words or phrases that are indicative of a low opinion about the business entity.

19. The system of claim 15, wherein the second database comprises a database of high satisfaction words or phrases that are indicative of a positive opinion about the business entity, a database of mid-satisfaction words or phrases that are indicative of a neutral opinion about the business entity and a database of low satisfaction words or phrases that are indicative of a low opinion about the business entity.

20. The system of claim 15, further comprising:

a secondary checker;

the computing system further adapted to perform the following:

determine, while searching for the one or more words or phrases that are included in the second database, that the communication includes insufficient information to determine the customer satisfaction rating based on a comparison with the one or more words or phrases;

in response, forwarding the communication to the secondary checker for further analysis to determine if contents of the communication other than the one or more words or phrases may be used to determine the customer satisfaction rating.

* * * * *

UNITED STATES PATENT AND TRADEMARK OFFICE
CERTIFICATE OF CORRECTION

PATENT NO. : 9,275,404 B2
APPLICATION NO. : 13/497494
DATED : March 1, 2016
INVENTOR(S) : Keerthi It is certified that error appears in the above-identified patent and that said Letters Patent is hereby corrected as shown below:

On the Title Page, in item (54), in "Title", in Column 1, Line 1, delete "COMMUNICATINS" and insert -- COMMUNICATIONS --, therefor.

In the Specification

In Column 1, Line 9, delete "§371" and insert -- § 371 --, therefor.

Signed and Sealed this
Fourteenth Day of June, 2016

Michelle K. Lee
*Director of the United States Patent and Trademark Office*